A. CONNING & V. BOURDON.
ADJUSTABLE MIRROR BRACKET.
APPLICATION FILED NOV. 26, 1913.
1,129,960. Patented Mar. 2, 1915.
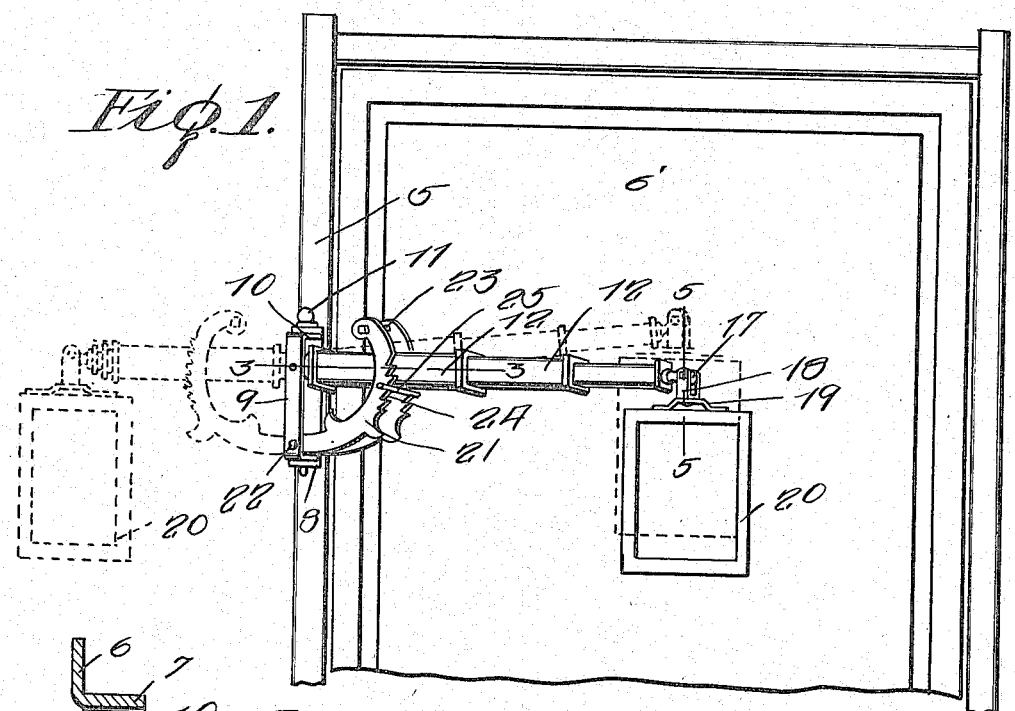
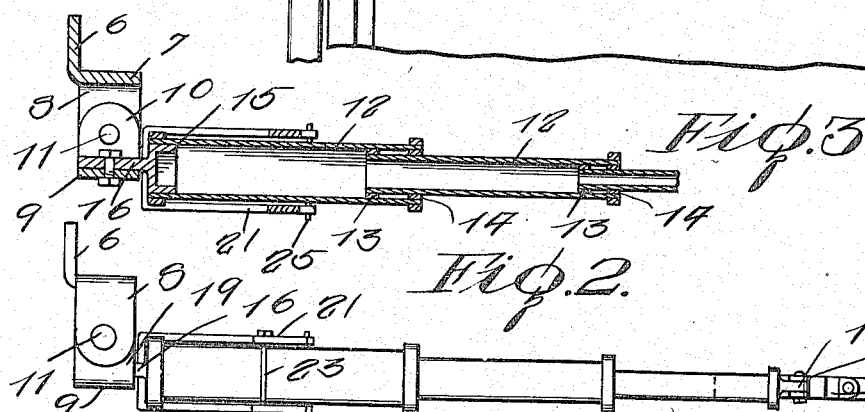
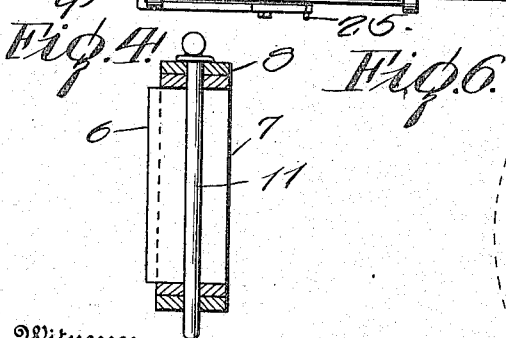
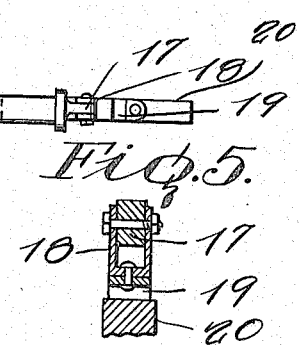
Inventors
A. Conning
V. Bourdon
Witnesses
Attorneys

UNITED STATES PATENT OFFICE.

ANDREW CONNING AND VICTOR BOURDON, OF SEATTLE, WASHINGTON.

ADJUSTABLE MIRROR-BRACKET.

1,129,960.       Specification of Letters Patent.        Patented Mar. 2, 1915.

Application filed November 26, 1913. Serial No. 803,258.

*To all whom it may concern:*

Be it known that we, ANDREW CONNING and VICTOR BOURDON, citizens of the United States, residing at Seattle, in the county of King, State of Washington, have invented certain new and useful Improvements in Adjustable Mirror-Brackets; and we do hereby declare the following to be a full, clear, and exact description of the invention, such as will enable others skilled in the art to which it appertains to make and use the same.

This invention relates to new and useful improvements in adjustable supports particularly adapted for holding mirrors.

The object of the present invention resides in the provision of an adjustable bracket whereby a small mirror may be held in any desired position with relation to its point of attachment to a suitable support, the mirror being carried for horizontal and vertical swinging movement with relation to the support and for movement toward and away from the support, the parts of the support being so arranged that they may be readily moved to a convenient position and being so mounted that they can if desired be readily removed from the support.

A further object of the invention resides in the provision of such a device which is simple and efficient in use and which may be manufactured at a comparatively low cost.

With these and other objects in view, the invention resides in the novel combination, formation and arrangement of parts to be more fully hereinafter described and illustrated in the accompanying drawings and particularly pointed out in the claim hereto appended.

Reference is had to the accompanying drawings wherein similar characters of reference designate corresponding parts throughout the several views, and in which:

Figure 1 is a view showing the device in applied position and in operative relation in full lines, and swung to inoperative position in dotted lines, Fig. 2 is a top plan view of the device, Fig. 3 is a sectional view taken centrally through the device, Fig. 4 is a sectional view taken through the fixed member of the device, Fig. 5 is a sectional view taken through the mirror engaging means, and Fig. 6 is a detail view showing the means for holding a circular mirror.

Referring now more particularly to the accompanying drawings, the improved mirror bracket is shown attached to one of the sides 5 of the frame of a large mirror 6'. Secured to one of the sides 5 by a lateral flange 6 on one edge thereof is the fixed member 7 of the bracket which is disposed vertically and has its ends directed outwardly at 8. The body portion of the support is carried by a bar 9 which has its end portions directed laterally as at 10 and lying between the ends 8 of the fixed member 7, a pin 11 being passed through alined openings in the ends whereby the member 9 is pivotally secured to the member 7. Upon withdrawing the pin, it is observed that the bar 9 carrying the body portion of the bracket becomes detached.

The mirror carrying arm of the bracket comprises a plurality of telescoping squared tubular sections 12 which are held from being disengaged by a suitable member 13 carried on the inner end of each section and adapted to abut against a member 14 secured to the inner face of the outer end of the adjacent section. To the inner end of the innermost telescoping section is secured a head 15 carrying an ear 16 which is pivotally secured to the upper portion of the bar 9. The outer end of the outermost section carries an ear 17 which is embraced by and pivotally connected with the free ends of the arms of a U-member 18. The bight portion of the U-member 18 is swivelly connected to a bar 19, having its end portions downwardly offset and secured to the frame of the small mirror 20. The mirror carrying arm may thus be swung vertically or horizontally and may be varied in length, the mirror being always disposed with its axis extending vertically.

To hold the mirror supporting arm in any desired position of its vertical swinging movement, a pair of arcuate bars 21 are provided having their lower ends directed together and secured at 22 to the lower portion of the bar 9. The major portions of these bars are spaced apart to embrace the mirror turning arm 12, the upper ends of said bars being held in such spaced relation by a bolt 23. The outer edges of these bars have recesses 24 cut therein and a pin 25 is provided selectively seating in a pair of the recesses and holding the mirror arms. The mirror 20 is shown as square, but should it however be desired to use a round mirror, a pair of bars 26 are provided which are connected together at their central portions and which have their ends bent in hook shape 27 to engage over the periphery of the mirror, the offset ends of the bar 19 being secured and to the adjacent end portions of the said bars 26.

From the foregoing it is observed that a very simple structure has been provided which is capable of any desired degree of adjustment and which may be easily attached or detached, or moved as desired to a convenient out-of-the-way position.

What is claimed is:

An adjustable bracket comprising a fixed member, a second member pivoted thereto, a mirror carrying arm pivoted to the upper portion of the pivoted member to swing in a plane at right angles to the swing of the pivoted member, a pair of arcuate bars secured to the lower portion of the pivoted member and extending in spaced relation embracing the arm, said bars being provided with recesses on their outer edges, and a pin seating in said recesses to limit pivotal movement of the arm.

In testimony whereof, we affix our signatures, in the presence of two witnesses.

ANDREW CONNING.
VICTOR BOURDON.

Witnesses:
J. Y. KELLOGG,
MARY COLT.